United States Patent [19]
Wright et al.

[11] Patent Number: 5,532,291
[45] Date of Patent: Jul. 2, 1996

[54] COATING COMPOSITION AND PROCESSES THEREFOR

[75] Inventors: Timothy J. Wright, Temperance, Mich.; Gary G. Hartman, Toledo; Jeffrey A. Culver, Sylvania, both of Ohio

[73] Assignee: Betco Corporation, Toledo, Ohio

[21] Appl. No.: 442,019

[22] Filed: May 16, 1995

[51] Int. Cl.$^6$ .............................. C08K 3/18; C08K 3/22; C08K 5/52; C08K 5/06
[52] U.S. Cl. .................... 523/122; 524/127; 524/377; 524/522; 524/523; 524/487; 106/15.05
[58] Field of Search ........................... 523/122; 524/377, 524/127, 522, 523, 487; 106/15.05

[56] References Cited

U.S. PATENT DOCUMENTS

| | | |
|---|---|---|
| Re. 29,409 | 9/1977 | Yeager ........................... 424/78 |
| 3,598,872 | 8/1971 | Ratz et al. . |
| 3,959,556 | 5/1976 | Morrison . |
| 4,018,611 | 4/1977 | Cramer et al. . |
| 4,299,749 | 11/1991 | McCarthy et al. . |
| 4,343,853 | 8/1992 | Morrison . |
| 4,401,712 | 8/1983 | Morrison . |
| 4,459,326 | 7/1984 | Colombo et al. . |
| 4,533,435 | 8/1985 | Intili . |
| 4,542,125 | 9/1985 | Gormann et al. . |
| 4,608,289 | 8/1986 | McIntosh . |
| 4,647,601 | 3/1987 | McIntosh . |
| 4,711,914 | 12/1987 | Rei et al. ........................... 523/122 |
| 4,753,749 | 6/1988 | McIntosh . |
| 4,867,898 | 9/1989 | Spaulding et al. . |
| 4,869,934 | 9/1989 | Jethwa . |
| 4,933,178 | 6/1990 | Capelli . |
| 4,935,232 | 6/1990 | McIntosh . |
| 4,996,052 | 2/1991 | McIntosh . |
| 5,024,875 | 6/1991 | Hill et al. . |
| 5,059,420 | 10/1991 | Scholla et al. . |
| 5,066,328 | 11/1991 | Zlotnik . |
| 5,090,990 | 2/1992 | McCoy et al. . |
| 5,133,933 | 7/1992 | McIntosh . |
| 5,137,759 | 8/1992 | Vinod . |
| 5,180,585 | 1/1993 | Jacobson et al. . |
| 5,191,002 | 3/1993 | Davis . |
| 5,238,749 | 8/1993 | Cueman et al. . |
| 5,244,667 | 9/1993 | Hagiwara et al. . |
| 5,264,250 | 11/1993 | Steele et al. . |
| 5,302,385 | 4/1994 | Khan et al. . |
| 5,305,827 | 4/1994 | Steele et al. . |
| 5,330,795 | 7/1994 | Batdorf et al. . |
| 5,334,603 | 8/1994 | Shankar et al. . |
| 5,385,604 | 1/1995 | Ainslie ........................... 106/15.05 |
| 5,385,902 | 1/1995 | Hsu . |

*Primary Examiner*—Paul R. Michl
*Assistant Examiner*—LaVonda R. Dewitt
*Attorney, Agent, or Firm*—Emch, Schaffer, Schaub & Procello Co.

[57] ABSTRACT

This invention is an anti-microbial coating including an anti-microbial agent which has proven to be effective in preventing the growth of the test microorganisms. Special manufacturing steps were needed to uniformly add the anti-microbial agent to the coating. Preferably, dissolving anti-microbial agent in tributoxyethyl phosphate (TBEP) is the best way to get the agent into the coating. In another embodiment, the coating provides a continual, disinfecting action.

15 Claims, No Drawings

COATING COMPOSITION AND PROCESSES THEREFOR

TECHNICAL FIELD

This invention relates to an aqueous coating composition. Specifically the composition is a floor coating. Other embodiments are processes for making and using the coating.

BACKGROUND OF THE INVENTION

Resilient floor coatings have been commercially available for some time. These coatings include biocidal compositions used in or on industrial and natural products to prevent attack by micro-organisms, in particular algae, fungi and bacteria. The industrial or natural products are for example paint and lacquer films, plasters, adhesives, glues, leather, textiles, natural fibers and the like. While many of these coatings provide improved properties, many still have serious draw-backs. Industry continues to improve the compositions.

DISCLOSURE OF INVENTION

We have invented an anti-microbial coating including an anti-microbial agent which has proven to be effective in preventing the growth of the test microorganisms. The coating has the following composition:

| Ingredients | Weight by Percent |
| --- | --- |
| Water | to 100 |
| Acrylate Vinyl Copolymer Emulsion | 30–50 |
| Polyalkylene Wax Emulsion | 5–10 |
| Carboxylic Acid-Vinyl Resin Solution | 3–6 |
| Dialkylene Glycol Alkyl Ether | 4–7 |
| Tributoxy Ethyl Phosphate | 1–2 |
| Tributoxy Pentanediol Diisobutyrate | 0–1 |
| 2,2,4-Trimethyl-1,3-Pentanediol Monoisobutyrate | 0–1 |
| Anti-Microbial Agent | 0.1–1.0 |

I also invented special manufacturing steps that were needed to uniformly add the anti-microbial agent to the coating. Incorporating the anti-microbial agent as a finely ground solid or pre-dissolved in conventional solvents were not successful. Premixing the anti-microbial agent in tributoxyethyl phosphate (TBEP) is the preferred way to get the agent into the coating.

In another embodiment, I also invented a coating that provides a continual, disinfecting action. As the anti-microbial is locked into the product's polymeric matrix and can only be removed through physically abrading the product, the product not only acts as a disinfectant but it also has a continuous disinfecting utility against Gram Positive and Gram Negative Microorganisms.

BEST MODE OF CARRYING OUT INVENTION

Preferably, my anti-microbial coating has the following composition:

| Ingredients | Weight by Percent |
| --- | --- |
| Water | to 100 |
| Acrylate Styrene Copolymer Emulsion | 35–45 |
| Polyethylene Wax Emulsion | 6–9 |
| Maleic Resin Solution | 4–5 |
| Diethylene Glycol Methyl Ether | 5–6 |
| Tributoxy Ethyl Phosphate | 1–2 |
| Tributoxy Pentanediol Diisobutyrate | 0–1 |
| 2,2,4-Trimethyl-1,3-Pentanediol Monoisobutyrate | 0–1 |
| Anti-Microbial Agent | 0.1 to less than 1.0 |

More preferably, the weight percent of anti-microbial agent is from 0.1 to 0.75 and most preferably from 0.1 to 0.5.

The anti-microbial agents can vary widely. One preferred agent is a chlorinated phenoxy compound from Microban Product Company, Microband B, or Ciba Geigy (Irgasan DP300). Other anti-microbial agents include oxalate derivatives which can be phenoxy substituted. See U.S. Pat. No. 5,385,902. Other chlorinated phenoxy compounds used as herbicides are found in U.S. Pat. No. 3,598,872.

Other anti-microbial agents are the halogenated aromatic nitriles (such as tetrachloroisophthalonitrile); Fungaflor, which is a salt of imazilil sulfate and a product of Janssen Pharmaceutical; 3,5,3',4'-tetrachlorosalicylanilide (also known as Irgasan, a product of Ciba-Geigy Company); and dichlorophene (2,2'-methylenebis-4-chlorophenol, a product of the Givaudan Corporation). Of these other additives, we prefer the use of tetrachloro-isophthalonitrile, and Irgasan. However, other antifungal and antibacterial agents not mentioned above may be used.

The anti-microbial additives may be used alone or in combination with each other as active ingredients in the binding agents. The amount used is generally an arbitrary amount, depending on the requirements of a particular application and cost effectiveness. Preferred amounts arrange from 0.1% to 0.5% percentage by weight of the aqueous composition. In order to add the anti-microbial agent uniformly to the coating, special manufacturing procedures are required.

One would expect that the anti-microbial agent might be incorporated into the coating formulation by dispersing as a finely ground solid or by pre-dissolving and adding as a solution.

We, however, determined that incorporating the anti-microbial agent as a finely ground solid was not successful no matter how fine the particle size. Even at 100 microns most of the anti-microbial agent settled out and caused some coagulation and precipitation of coating ingredients. Attempts to pre-dissolve the anti-microbial agent in conventional solvents (alcohols, aliphatic hydrocarbons, aromatic hydrocarbons) and add to the coating formula also resulted in coagulation or precipitation of coating ingredients.

We then pre-dissolved the anti-microbial agent into the liquid, solvent like ingredients used in the coating formulation. We determined that the preferred liquid ingredient with the proper combination of chemical and physical properties for this purpose was the tributoxyethyl phosphate (TBEP). Incorporating the anti-microbial agent into the coating formula using the tributoxyethyl phosphate gave the following unique and desirable properties to the coating and resulting film.

1. The anti-microbial agent has sufficient solubility in the TBEP to consider using TBEP as a premix solvent.

2. TBEP is already present in the formula at an amount that allows the incorporation of the proper amount to TBEP and anti-microbial if the anti-microbial agent is pre-dissolved in the TBEP.

3. No adverse results were observed with product storage characteristics, film forming properties, and coating properties when using TBEP.

4. No special manufacturing procedures were required when using TBEP as the premix solvent.

5. The other liquid, solvent like ingredients in the coating formula may be used. Any of the plasticizer or combining agents can be be used as the pre-dissolving agent. For example, DGME, the butyrates or diols may be used.

We specifically developed this composition for floors comprising a variety of substrates including wood, linoleum, vinyl tile, etc., including no-wax flooring materials. No-wax floors, although coated with a "permanent" protective glossy coating comprising, e.g., a urethane type coating, nonetheless need protecting. Therefore, a need exists for a coating and polishing composition which periodically can be applied to no-wax flooring in order to maintain the appearance thereof.

The instant composition can be applied to flooring using well known techniques, e.g. by mopping with a suitable mop. The composition should be applied to flooring as an even thin layer and allowed to dry thoroughly.

The composition of the invention is a liquid having good stability. The film deposited therefrom is clear and resistant to discoloration, has a high gloss and exhibits good wearability, scuff resistance and water and water spotting resistance.

The carboxylic acid-vinyl resin is a reaction product of a polycarboxylic acid or its anhydride and a vinyl monomer. The acid has 1 to 10 carbon atoms and the vinyl monomer is styrene or alkyl styrene wherein alkyl has 1 to 8 carbon atoms. Preferred acids are maleic, fumaric or their anhydrides. The preferred vinyl monomer is styrene.

The alkyl ether of dialkylene glycol has alkyl groups containing 1 to 10 carbon atoms. I prefer diethylene glycol methyl ether or dipropylene glycol methyl ether. Other alkyl ethers include dipropylene glycol, 2-butoxyethanol and 3-methyoxybutanol.

The acrylate vinyl copolymer is a polymer comprising a reaction product of a monomer of acrylic acid, methacrylic acid, alkyl acrylate or alkyl methacrylate wherein alkyl has 1 to 8 carbon atoms and a vinyl monomer of styrene or alkyl styrene wherein alkyl has 1 to 8 carbon atoms.

The polyalkylene wax is a polyolefin having 1 to 10 carbon atoms. Polyethylene and polypropylene are typical with polyethylene wax being preferred.

The following example illustrates our formulation:

| Ingredients | Weight by Percent |
| --- | --- |
| Water | to 100 |
| Acrylate Styrene Copolymer Emulsion | 37–43 |
| Polyethylene Wax Emulsion | 7–8 |
| Maleic Resin Solution | 4–5 |
| Diethylene Glycol Methyl Ether | 5–6 |
| Tributoxy Ethyl Phosphate | 1–2 |
| Tributoxy Pentanediol Diisobutyrate | 0.1–1 |
| 2,2,4-Trimethyl-1,3-Pentanediol Monoisobutyrate | 0.1–1 |
| Chlorinated Phenoxy Compound | 0.1–0.5 |

The coating provides a continual, disinfecting action. The anti-microbial microbial is a part of the product's polymeric matrix. The product not only acts as a disinfectant but it also has a continuous disinfecting utility against Gram Positive and Gram Negative microorganisms. The coating also prevents odors. It counteracts odors as the anti-microbial agent protects against odor causing microorganisms. The coating also extends the floor life.

As the product contains an anti-microbial, this product protects against microorganisms breaking down the polymer components of the product. The formulation also preserves unused product. It preserves unused finish against microbial contamination. Users are typically instructed not to save unused product. However, with the advent of new floor finish application systems now in the industry, the finish can be kept in airtight pails and buckets for extended periods of time. Our new product would eliminate user concern over bacterial growth in these containers. The product contains no known toxins, such as alcohol or heavy metals. Product is safe, having an LD50 less than aspirin.

I claim:

1. A coating composition consisting essentially of:

| Ingredients | Weight by Percent |
| --- | --- |
| Water | to 100 |
| Acrylate Vinyl Copolymer Emulsion | 30–50 |
| Polyalkylene Wax Emulsion | 5–10 |
| Carboxylic Acid-Vinyl Resin Solution | 3–6 |
| Dialkylene Glycol Alkyl Ether | 4–7 |
| Tributoxy Ethyl Phosphate | 1–2 |
| Tributoxy Pentanediol Diisobutyrate | 0–1 |
| 2,2,4-Trimethyl-1,3-Pentanediol Monoisobutyrate | 0–1 |
| Anti-Microbial Agent | 0.1–1.0 |

2. A composition according to claim 1 consisting essentially of:

| Ingredients | Weight by Percent |
| --- | --- |
| Water | to 100 |
| Acrylate Styrene Copolymer Emulsion | 35–45 |
| Polyethyl Wax Emulsion | 6–9 |
| Maleic Vinyl Resin Solution | 4–5 |
| Diethylene Glycol Methyl Ether | 5–6 |
| Tributoxy Ethyl Phosphate | 1–2 |
| Tributoxy Pentanedial Diisobutyrate | 0–1 |
| 2,2,4-Trimethyl-1,3-Pentanediol Monoisobutyrate | 0–1 |
| Anti-Microbial Agent | 0.1 to less than 1.0. |

3. A composition according to claim 1 wherein the weight percent of anti-microbial agent ranges from 0.1 to 0.75.

4. A composition according to claim 1 wherein the weight percent of anti-microbial agent ranges from 0.1 to 0.5.

5. A composition according to claim 1 consisting essentially of:

| Ingredients | Weight by Percent |
| --- | --- |
| Water | to 100 |
| Acrylate Styrene Copolymer Emulsion | 37–43 |
| Polyethylene Wax Emulsion | 7–8 |
| Maleic Vinyl Resin Solution | 4–5 |
| Diethylene Glycol Methyl Ether | 5–6 |
| Tributoxy Ethyl Phosphate | 1–2 |
| Tributoxy Pentanediol Diisobutyrate | 0.1–1 |
| 2,2,4-Trimethyl-1,3-Pentanediol Monoisobutyrate | 0.1–1 |
| Chlorinated Phenoxy Compound | 0.1–0.5. |

6. A composition according to claim 1 wherein the anti-microbial agent is pre-dissolved in any of the ingredients of the Composition which can act as a solvent for and are capable of dissolving the anti-microbial agent.

7. A composition according to claim 1 where the anti-microbial agent is pre-dissolved in the tributoxy ethyl phosphate.

8. A composition according to claim 1 wherein the anti-microbial agent is a phenoxy substituted compound.

9. A composition according to claim 1 including two or more anti-microbial agents.

10. A composition according to claim 1 where the anti-microbial agent is a chlorinated phenoxy compound.

11. A process for producing an aqueous, anti-microbial coating composition comprising the steps of:

first, preparing a solution by pre-dissolving an anti-microbial agent in an ingredient of the composition which can act as a solvent for and is capable of dissolving the anti-microbial agent; and then adding the resulting solution to the aqueous coating composition, wherein the aqueous coating composition consists essentially of:

| Ingredients | Weight by Percent |
| --- | --- |
| Water | to 100 |
| Acrylate Vinyl Copolymer Emulsion | 30–50 |
| Polyalkylene Wax Emulsion | 5–10 |
| Carboxylic Acid-Vinyl Resin Solution | 3–6 |
| Dialkylene Glycol Alkyl Ether | 4–7 |
| Tributoxy Ethyl Phosphate | 1–2 |
| Tributoxy Pentanediol Diisobutyrate | 0–1 |
| 2,2,4-Trimethyl-1,3-Pentanediol Monoisobutyrate | 0–1 |
| Anti-Microbial Agent | 0.1–1.0. |

12. A process according to claim 11 wherein the ingredient of the composition which can act as a solvent for the anti-microbial agent is tributoxy ethyl phosphate.

13. A process for inhibiting the growth of microorganisms on a material comprising the steps of:

first, preparing a solution by pre-dissolving an anti-microbial agent in an ingredient which acts as a solvent for and is capable of dissolving the anti-microbial agent;

then, adding the resulting solution to an aqueous coating composition, wherein the aqueous coating composition consists essentially of:

| Ingredients | Weight by Percent |
| --- | --- |
| Water | to 100 |
| Acrylate Vinyl Copolymer Emulsion | 30–50 |
| Polyalkylene Wax Emulsion | 5–10 |
| Carboxylic Acid-Vinyl Resin Solution | 3–6 |
| Dialkylene Glycol Alkyl Ether | 4–7 |
| Tributoxy Ethyl Phosphate | 1–2 |
| Tributoxy Pentanediol Diisobutyrate | 0–1 |
| 2,2,4-Trimethyl-1,3-Pentanediol Monoisobutyrate | 0–1 |
| Anti-Microbial Agent | 0.1–1.0; | subsequently, coating the material with the aqueous coating composition;

drying the coated material; and inhibiting the growth of microorganisms.

14. A process according to claim 13 wherein the ingredient of the composition which can act as a solvent for the anti-microbial agent is tributoxy ethyl phosphate.

15. A process according to claim 13 wherein the material is wood flooring.

* * * * *